Figure 1:
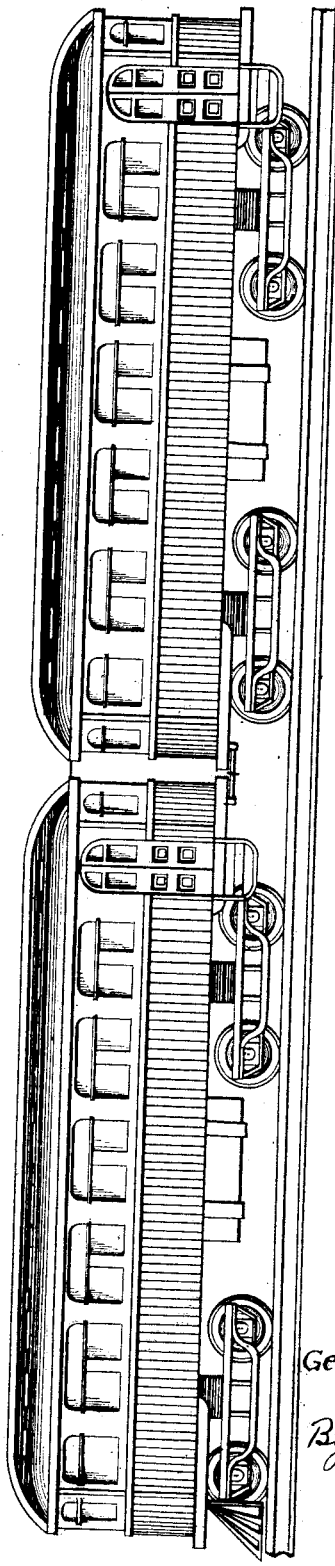

No. 831,244. PATENTED SEPT. 18, 1906.
G. G. SCHROEDER.
COMBINED MECHANICAL AND ELECTRIC MOTIVE POWER FOR TRAINS.
APPLICATION FILED APR. 17, 1905.

8 SHEETS—SHEET 1.

Witnesses

Inventor
George G. Schroeder
By Alfred E. Glanoch
Attorney

No. 831,244. PATENTED SEPT. 18, 1906.
G. G. SCHROEDER.
COMBINED MECHANICAL AND ELECTRIC MOTIVE POWER FOR TRAINS.
APPLICATION FILED APR. 17, 1905.
8 SHEETS—SHEET 4.

Witnesses
Inventor
Georg G. Schroeder
By Alfred E. Glascock
Attorney

No. 831,244. PATENTED SEPT. 18, 1906.
G. G. SCHROEDER.
COMBINED MECHANICAL AND ELECTRIC MOTIVE POWER FOR TRAINS.
APPLICATION FILED APR. 17, 1905.

8 SHEETS—SHEET 6.

No. 831,244. PATENTED SEPT. 18, 1906.
G. G. SCHROEDER.
COMBINED MECHANICAL AND ELECTRIC MOTIVE POWER FOR TRAINS.
APPLICATION FILED APR. 17, 1905.

8 SHEETS—SHEET 7.

Inventor
George G. Schroeder

Witnesses

By Alfred E. Glascock
Attorney

No. 831,244. PATENTED SEPT. 18, 1906.
G. G. SCHROEDER.
COMBINED MECHANICAL AND ELECTRIC MOTIVE POWER FOR TRAINS.
APPLICATION FILED APR. 17, 1905.

8 SHEETS—SHEET 8.

Witnesses
Berken G Brown
Osgood Holmes

Inventor
George G Schroeder
By Alfred E Hancock
Attorney

UNITED STATES PATENT OFFICE.

GEORGE G. SCHROEDER, OF WASHINGTON, DISTRICT OF COLUMBIA.

COMBINED MECHANICAL AND ELECTRIC MOTIVE POWER FOR TRAINS.

No. 831,244.  Specification of Letters Patent.  Patented Sept. 18, 1906.

Application filed April 17, 1905. Serial No. 256,102.

*To all whom it may concern:*

Be it known that I, GEORGE G. SCHROEDER, a citizen of the United States, residing at Washington, in the District of Columbia, have invented new and useful Improvements in a Combined Mechanical and Electric Motive Power for Trains, of which the following is a specification.

This invention has relation to combined mechanical and electric motive power for trains; and it consists in the novel construction and arrangement of its parts, as hereinafter shown and described.

The object of the invention is to provide a car or a train with an engine which is geared to and adapted to operate the axles of one set of trucks.

A rotary generator is so located with relation to said engine as to be operated thereby and is electrically connected with suitable storage batteries carried by the car or cars. The remaining trucks of the car or cars, except the one carrying the axles, heretofore referred to, which are geared to the engine, are provided with electric motors, which are electrically connected to the said storage batteries and also to the aforesaid generator. Thus the axles of the remaining trucks may be electrically operated, and by providing such a combination all of the wheels throughout the train may be converted into drivers. The current generated by the rotary generator may also be used for lighting and signaling. By providing such a combination the engine alone may be used under ordinary circumstances for propelling the car or train, and under extraordinary conditions both the engine and the electric current may be used for propelling. Furthermore, the trailing cars are provided with storage batteries which may be charged, and when the said trailers are cut loose from the train the current thus stored may be used for moving the said trailers and also for maintaining the lights.

With these and other objects in view my invention consists in the construction and combination hereinafter described, and pointed out in the appended claims.

Figure 2:
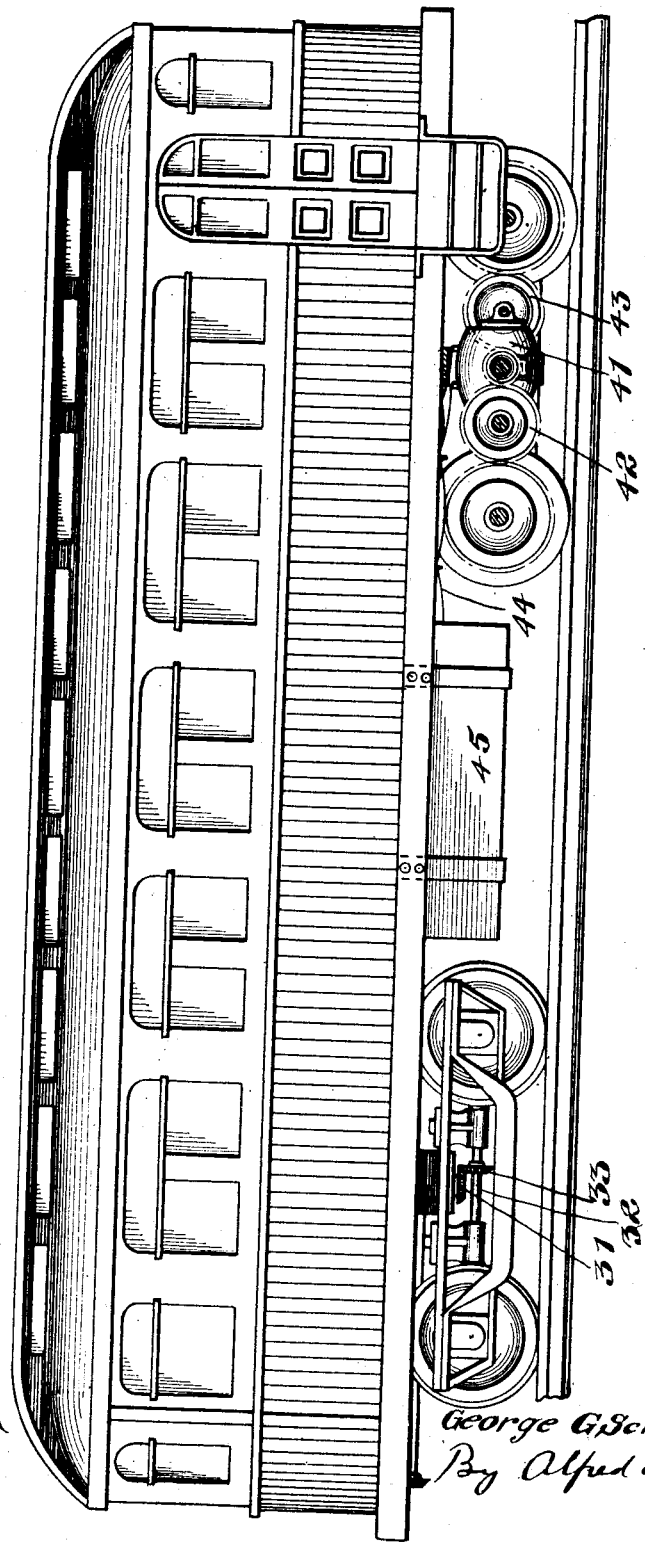
Figure 3:
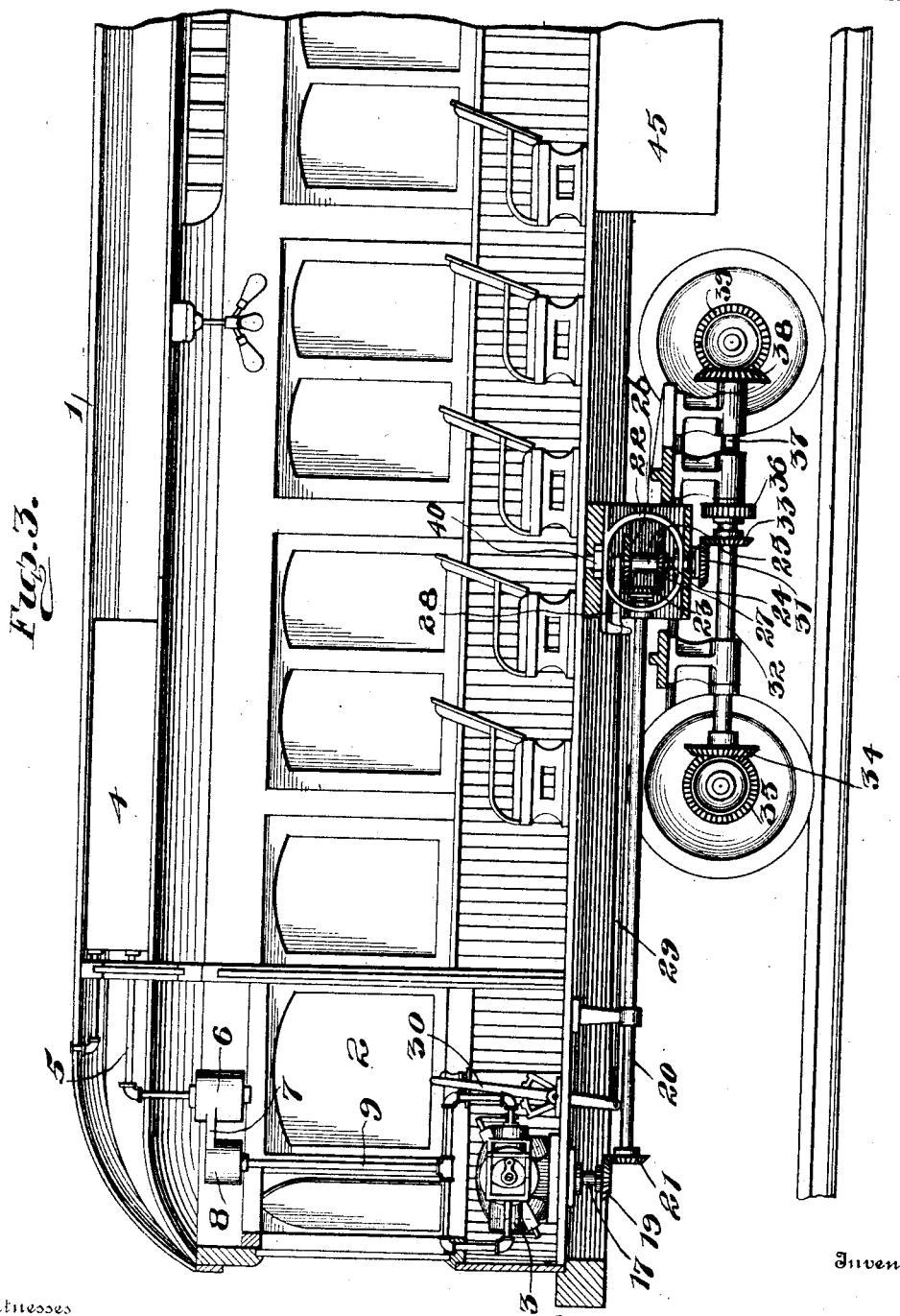
Figure 4:
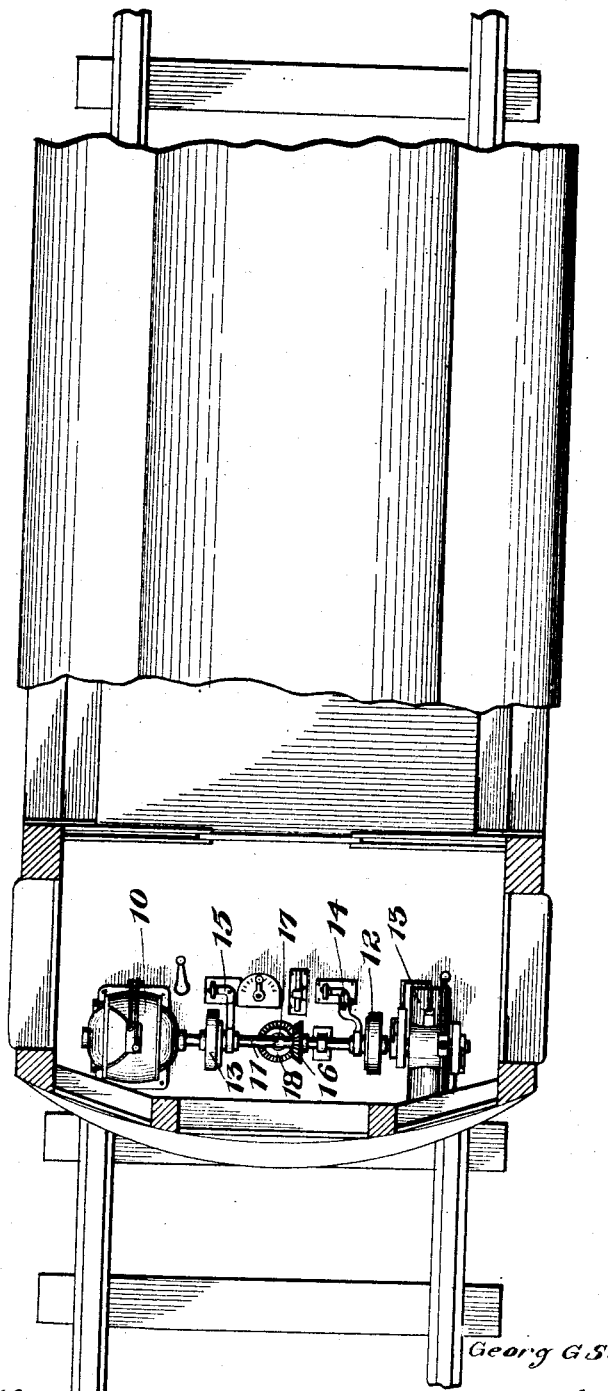
Figure 5:
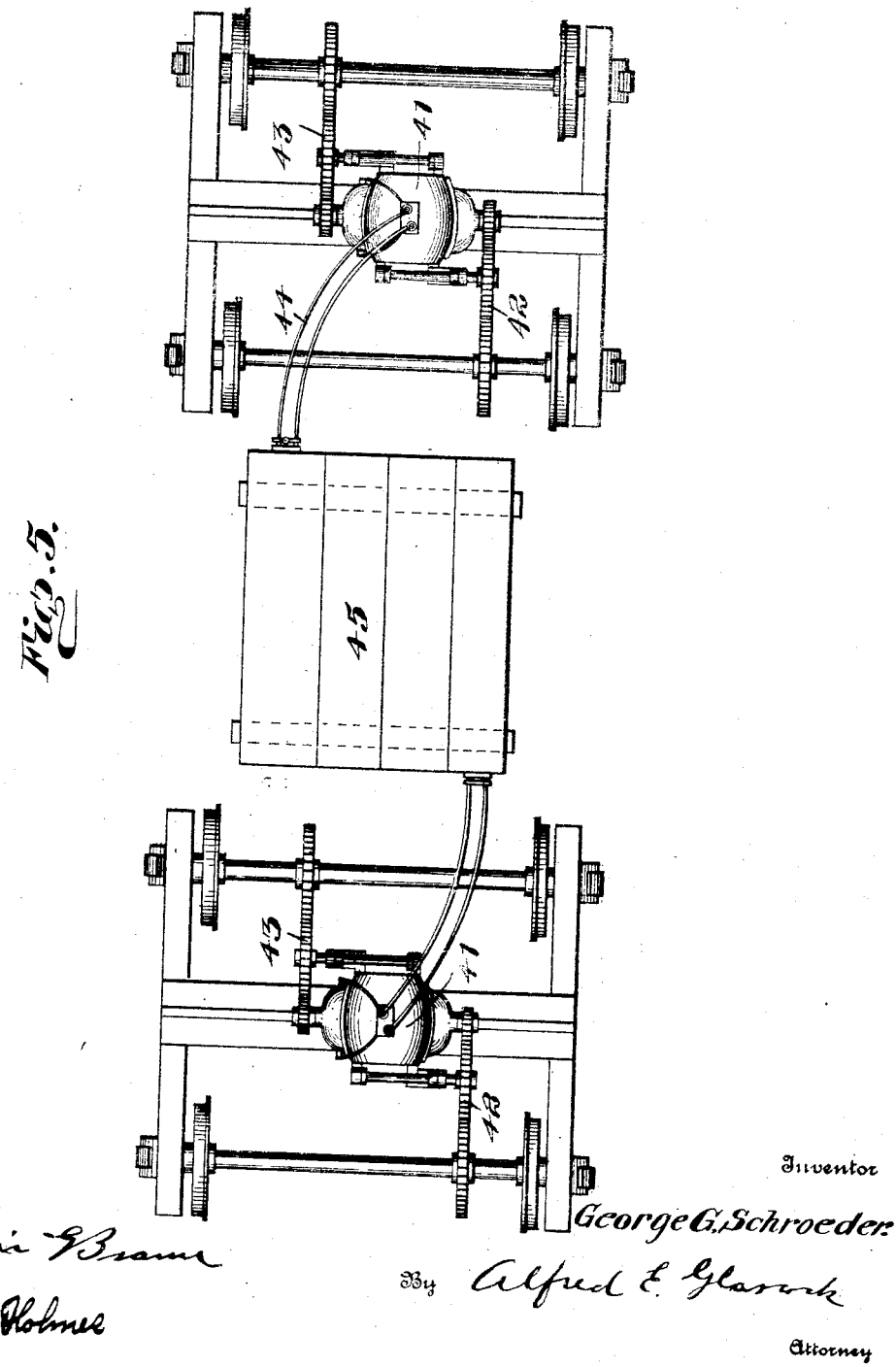
Figure 6:
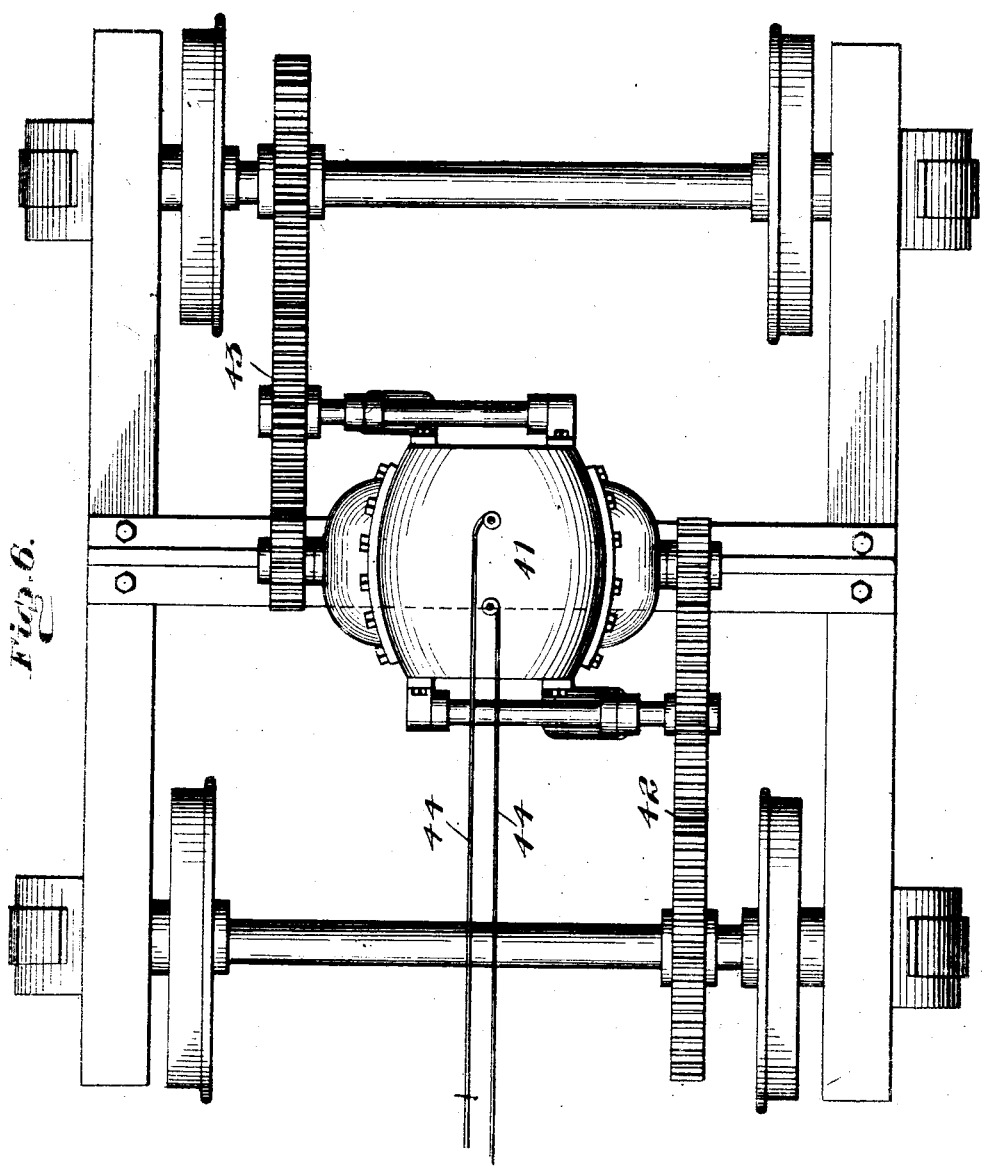
Figure 7:
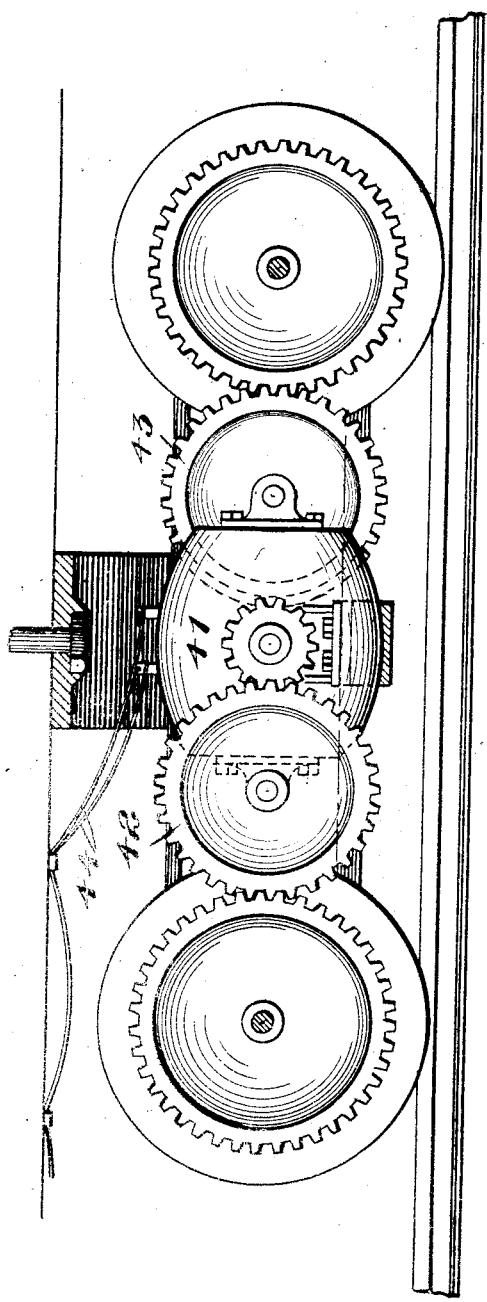
Figure 8:
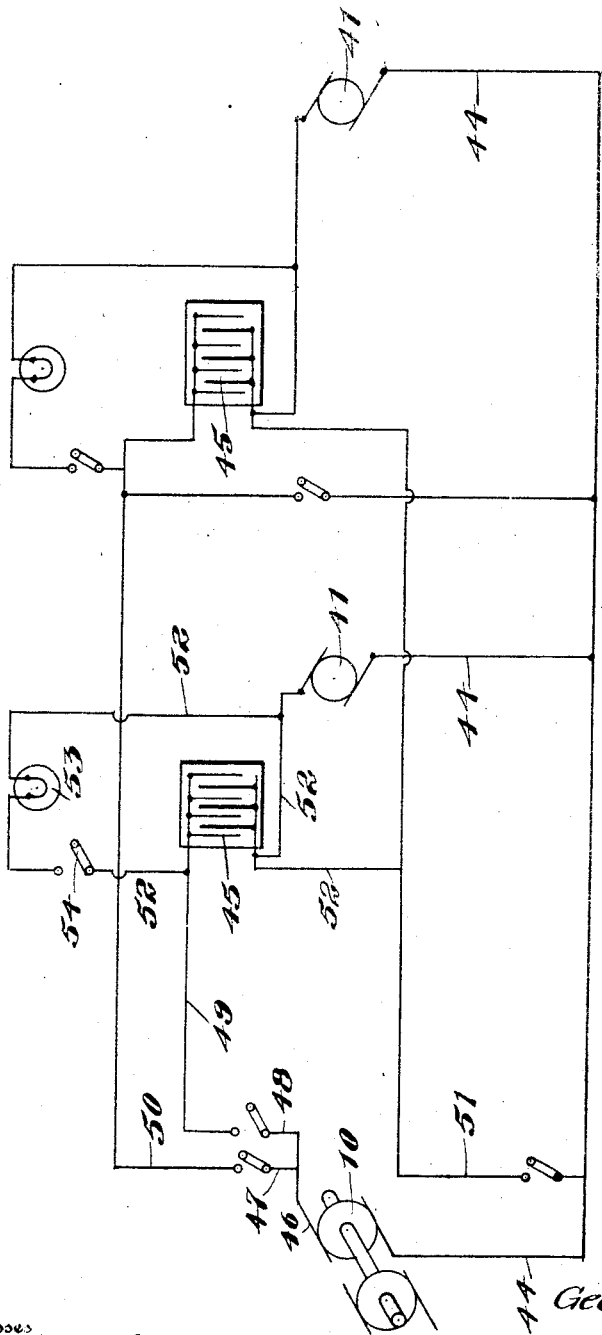

In the accompanying drawings, Figure 1 is a side elevation of a train provided with the herein-described means for propelling the same. Fig. 2 is a side elevation, partly in section, of the forward car of the train. Fig. 3 is a longitudinal sectional view of the front end of the forward car. Fig. 4 is a horizontal sectional view of the front end of the forward car. Fig. 5 is a top plan view of the running-gear of a trailer. Fig. 6 is a top plan view of a truck used on the forward car and also on the trailers, said truck being provided with an electric motor geared to the axles. Fig. 7 is a side elevation, partly in section, of the truck as shown in Fig. 6; and Fig. 8 is a diagrammatic view of the electric circuits as used in a forward car and trailer.

The forward car 1 is provided at its front end with a compartment 2, within which is located an engine 3. Said engine is preferably of the rotary hydrocarbon type. The oil-tank 4 is located just below the roof of the car and is connected, by means of the pipe 5, with the carbureter 6. The pipe 7 connects the carbureter 6 with the mixer 8, and the pipe 9 connects the mixer 8 with the engine 3. The oil-tank, carbureter, and mixer above referred to are of the ordinary construction. The oil is deposited in the said tank, from which place it passes through the pipe 5 into the carbureter 6, where it is converted into gas. The gas then passes through the pipe 7 into the mixer 8, where it is mixed with the air. The mixture thus produced then passes to the cylinders of the engine 3 through the pipe 9. Aside from the fact that the type of the engine 3 is of the rotary hydrocarbon type the particular construction of the said engine forms no part of the invention.

In the drawings the engine 3 is shown as located on the forward platform, and adjacent thereto is located a rotary generator 10. The shaft of the said generator 10 is in alinement with the shaft of the engine 3. A gearing is provided between the shaft of the engine 3 and the shaft of the generator 10. Said gearing consists of an intermediate shaft 11, which is alined with the shafts of the engine 3 and the generator 10. A set of friction-disks 12 is provided at the point where the shaft of the engine 3 meets the end of the shaft 11, and a set of friction-disks 13 is provided at the point where the end of the shaft of the generator 10 meets the end of the intermediate shaft 11. The lever 14 is adapted to operate the sliding member of the set of friction-disks 12, and the lever 15 is adapted to operate the sliding member of the friction-disks 13. A beveled gear-wheel 16 is located upon the intermediate shaft 11. The vertical shaft 17 extends through the bottom of the body of the car. The beveled gear-wheel 18 is fixed to the upper end of the shaft 17, and the said beveled gear-wheel 18 meshes with the beveled gear-wheel 16. The beveled gear-wheel 19 is fixed to the lower end of the vertical shaft 17. The horizontal shaft 20 is journaled under the bottom of the body of the car. Said shaft is provided at its forward end with a beveled gear-wheel 21, which meshes with the beveled gear-wheel 19. The rear end of the said shaft 20 enters the bracket 22 and is provided with the beveled gear-wheel 23. The vertical shaft 24 is journaled within the bracket 22, and the sliding sleeve 25 is located upon the said vertical shaft 24. The upper beveled gear-wheel 26 is fixed to the sleeve 25, as is also the lower beveled gear-wheel 27. Said beveled gear-wheels 26 and 27 are so spaced apart that but one at a time is in mesh with the beveled gear-wheel 23, and the said sleeve 25 may be so moved as to take both of the gear-wheels 26 and 27 out of mesh with the said beveled gear-wheel 23. The means for moving the sleeve 25 and its attachments consists of a bell-crank lever 28, suitably fulcrumed and which engages at one end the said sleeve 25. The rod 29 is attached to the other end of the said bell-crank lever 28 and connects with the lever 30, located in the compartment 2.

The beveled gear-wheel 31 is fixed to the lower end of the vertical shaft 24. The shaft 32 is journaled to the truck of the car and is provided with the beveled gear-wheel 33, which meshes with the beveled gear-wheel 31. At one end the said shaft 32 is provided with the beveled gear-wheel 34, which meshes with a beveled gear-wheel 35, fixed to the forward axle of the truck. The rear end of the shaft 32 is provided with a gear-wheel 36, which meshes with a similar gear-wheel (not shown) at the forward end of the shaft 37. The rear end of the shaft 37 is provided with a beveled gear-wheel 38, which meshes with a beveled gear-wheel 39 of the rear axle of the truck.

It will be observed that the bracket 22 and the contents thereof are centered in vertical alinement with the pivotal point 40 of the car-truck, and therefore as the body of the car projects out of alinement with the truck in rounding a curve the location of the bracket 22 and its contents at the particular point specified compensates for and permits such difference in direction between the car-body and the truck.

When the members of the friction-disks 12 are in engagement, rotary motion is transmitted from the shaft of the engine 3 to the intermediate shaft 11, which rotates the beveled gear-wheel 16. This in turn rotates the beveled gear-wheel 18 and the shaft 17. The wheel 19, carried by the shaft 17 and which engages the wheel 21, carried by the shaft 20, rotates the last said shaft. By the manipulation of the lever 30 the sleeve 25 and its attachments may be moved to bring either the gear-wheel 26 or the gear-wheel 27 into mesh with the gear-wheel 23. The bringing into such mesh of the gear-wheel 26 causes the shaft 24 and its attachments to rotate in one direction and also the axles of the truck to rotate in one direction. The bringing into such mesh of the gear-wheel 27 causes the said shaft 24 and its attachments to rotate in the opposite direction. Thus the car or train may be controlled in its forward or backward movement by the operation of the lever 30. Also the said lever may be so moved as to bring both the gear-wheels 26 and 27 out of mesh with the gear-wheel 23, in which case the rotary motion to the parts below the said bracket 22 is interrupted and the car comes to a stop.

The rear truck of the forward car is provided with a motor 41. Said motor is centrally located upon the said truck. One end of the shaft of the said motor 41 is connected by a chain of gear-wheels 42 with the front axle of the truck and the other end of the shaft of the said motor is connected by a chain of gear-wheels 43 with the rear axle of the truck.

The current-wires 44 44 connect with the said motor 41 and are adapted to transmit the electric current to the same. Each car is provided with a set of storage-cells 45, which are electrically connected to the electric motor or motors of the respective car, carrying the said storage-cell. The said storage-cells are also electrically connected with the generator 10, located upon the forward car of the train.

Fig. 8 of the drawings shows a diagrammatic view of the various circuits. The wire 44 connects at one end one of the brushes of the generator 10. The other end of the said wire connects one of the brushes of the motor 41. If two or more cars are used upon the same train, the electric wires of one car are connected with the electric wires of the next adjacent car by means of plugs in the well-known manner. Therefore a description of the circuit of one car will answer for the description of all.

The wire 46 connects the opposite brush of the generator 10 and is provided with the branches 47 and 48, each of which is provided with a switch. The wire 49 leads from a point opposite the switch of the wire 48 to the battery 45, while the wire 50 leads from a point opposite the switch of the wire 47 to the battery 45 of the next car. The wire 51, having a switch, connects the wire 44 with the battery of the next car, this arrangement being necessary to supply power to the motors 41 when the storage batteries 45 are employed in lieu of the generator 10. The wire 52 connects the wire 51 with the battery of the forward car and also with the motor 41 of the forward car, also with the lights 53. The wire 52 is provided with a switch 54, and the other end of the said wire 52 connects with the wire 49.

If for any reason the engine 3 should become disabled, so as to prevent the operation of the generator 10, the circuit is closed through wire 51, thus connecting the storage batteries 45 with the motors 41 through wire 44. Wires 49 and 50 of course become dead when the generator 10 ceases to operate. As soon as the circuit is closed between the storage batteries and the motors the latter are rotated under the influence of the current from said batteries, and rotation is imparted to the axles through the gears 42 43. (See Fig. 5.)

The system for wiring forms no essential part of the invention, as any other system which accomplishes the same as that shown and described may be employed. The object of the electric system as described is to provide a means for storing current in the batteries. The said current when so stored may be used for lighting and as a means for operating the electric motors.

The operation of the electric motors may be accomplished while the train is in its entirety or upon any individual car when it is cut loose from the train.

Having described my invention, what I claim as new, and desire to secure by Letters Patent, is—

1. A combined mechanical and electric motive power for cars comprising an engine mounted upon the car and having its shaft geared with the axles of one of the trucks of the car, a motor located on the other truck, a generator on said car electrically connected with said motor, means for connecting said generator with said engine-shaft, and means for disconnecting the engine-shaft from the gearing of the first-mentioned truck.

2. A combined mechanical and electrical motive power for cars consisting of an engine mounted upon the car, and having its shaft geared to the axles of one truck, a generator located upon the car, and adapted to be operated by the said engine, storage-cells carried by the car and being electrically connected with said generator, a motor located upon one of the trucks, and being operatively connected with the axles thereof, and electrically connected with said battery.

3. A combined mechanical and electric motive power for cars consisting of an engine mounted upon a car, and having its shaft geared to the axles of one truck, a generator located upon the same car as the engine, and adapted to be operated thereby, a motor located upon the other truck of the said car, and being operatively connected with the axles thereof, and electrically connected with the generator, and a trailer-car also having on each truck a motor similarly connected to the axles, and electrically connected with said generator.

4. A combined mechanical and electric motive power for cars comprising an engine mounted upon the car and having its shaft geared with the axles of one of the trucks of the car, a motor on the other truck, a storage battery carried by the car and electrically connected with said motor, a generator on said car electrically connected with said storage battery, means for connecting the generator with the engine-shaft, and means for disconnecting the engine-shaft from the gearing of the first-mentioned truck.

5. A combined mechanical and electric motive power for cars comprising an engine mounted upon the car and having its shaft geared to the axle of one of the trucks of the car, a generator located on the car and having its shaft in line with the shaft of said engine, means for clutching and unclutching said shafts, and a motor on the other truck electrically connected with said generator.

In testimony whereof I affix my signature in presence of two subscribing witnesses.

GEORGE G. SCHROEDER.

Witnesses:
E. W. VAN DYKE,
F. LIEBSCHUTZ.